(12) United States Patent
Takahashi et al.

(10) Patent No.: US 10,852,204 B2
(45) Date of Patent: Dec. 1, 2020

(54) DYNAMOMETER DEVICE

(71) Applicant: MEIDENSHA CORPORATION, Tokyo (JP)

(72) Inventors: Toshimichi Takahashi, Ota (JP); Yoshinori Fujimoto, Kiryu (JP); Yuki Ugamochi, Fukaya (JP); Nobuo Okazaki, Hachioji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/607,814

(22) PCT Filed: Apr. 6, 2018

(86) PCT No.: PCT/JP2018/014654
§ 371 (c)(1),
(2) Date: Oct. 24, 2019

(87) PCT Pub. No.: WO2018/198716
PCT Pub. Date: Nov. 1, 2018

(65) Prior Publication Data
US 2020/0191671 A1 Jun. 18, 2020

(30) Foreign Application Priority Data
Apr. 26, 2017 (JP) .................. 2017-086744

(51) Int. Cl.
*G01L 3/00* (2006.01)
*G01L 3/22* (2006.01)
(Continued)

(52) U.S. Cl.
CPC ............. *G01L 3/22* (2013.01); *G01M 15/02* (2013.01); *G01N 3/02* (2013.01); *H02K 9/19* (2013.01)

(58) Field of Classification Search
CPC ........... G01L 3/22; G01M 15/02; G01N 3/02; H02K 9/19
(Continued)

(56) References Cited

U.S. PATENT DOCUMENTS 4,563,128 A * 1/1986 Rossmann .............. F01D 5/284
416/92
4,798,770 A 1/1989 Donomoto et al.
(Continued)

FOREIGN PATENT DOCUMENTS

JP 60-175848 11/1985
JP 2-50173 B2 11/1990
(Continued)

*Primary Examiner* — Max H Noori
(74) *Attorney, Agent, or Firm* — Foley & Lardner LLP

(57) ABSTRACT

A heat insulation plate (25) is interposed between a coupling (21) and an adapter flange (22) in a main shaft (6) of a dynamometer (3). A torque meter (24) is disposed between a coupling flange (23) that serves as a test-piece connection surface (56) and the adapter flange (22). To surround a periphery of these, a cover (7) is provided. An air conditioner utilizing a refrigeration cycle supplies a cold wind to an inside space of the cover (7). The heat insulation plate (25) suppresses heat transmission from an electric motor of the dynamometer (3) to the torque meter (24). Therefore, the torque meter (24) is effectively cooled by the cold wind.

19 Claims, 14 Drawing Sheets

(51) Int. Cl.
*G01M 15/02* (2006.01)
*G01N 3/02* (2006.01)
*H02K 9/19* (2006.01)

(58) Field of Classification Search
USPC .................................................. 73/862.08
See application file for complete search history.

(56) References Cited

U.S. PATENT DOCUMENTS

| | | | |
|---|---|---|---|
| 5,770,933 A * | 6/1998 | Larson | F04D 27/004 |
| | | | 318/400.41 |
| RE46,753 E | 3/2018 | Nakagawa | |
| 2002/0168554 A1* | 11/2002 | Matsui | F27D 1/1652 |
| | | | 428/699 |
| 2008/0006040 A1* | 1/2008 | Peterson | B60H 1/3204 |
| | | | 62/116 |
| 2012/0103079 A1 | 5/2012 | Sennhenn et al. | |
| 2014/0360284 A1* | 12/2014 | Nakagawa | G01M 13/02 |
| | | | 73/862.191 |
| 2015/0369702 A1* | 12/2015 | Barnes | G01M 13/025 |
| | | | 73/116.06 |

FOREIGN PATENT DOCUMENTS

| | | |
|---|---|---|
| JP | 2003-130751 A | 5/2003 |
| JP | 2012-528301 A | 11/2012 |
| JP | 2013-130557 A | 7/2013 |
| JP | 2013-210202 A | 10/2013 |
| JP | 2015-21560 A | 2/2015 |
| JP | 5942543 B2 | 6/2016 |
| WO | WO 2013/111685 A1 | 8/2013 |

* cited by examiner

DYNAMOMETER DEVICE

TECHNICAL FIELD

The present invention relates to a dynamometer device that conducts performance evaluation or test of a vehicular power train or engine. In particular, it relates to an improvement of a dynamometer device equipped with a torque meter between a main shaft of the dynamometer and the test piece.

BACKGROUND ART

There is known a dynamometer device that conducts performance evaluation or test by using a vehicular power train, engine alone, or transmission as a test piece. This dynamometer device is configured such that a rotation shaft on the test piece side, such as a drive shaft of transmission or a crankshaft of engine, is connected to a tip end of the main shaft of the dynamometer. Patent Publication 1 and Patent Publication 2 disclose a dynamometer device that is equipped with a torque meter to detect the shaft torque between the main shaft of the dynamometer and the test piece.

In general, the torque meter is configured to detect a torque acting between a flange on the main shaft side of the dynamometer and a flange on the test-piece side with a high precision and gain the output in a noncontact manner. In such a torque meter that requires a high detection precision, as mentioned as the task in Patent Publication 1, there is a problem that a characteristic change in accordance with temperature, that is, temperature drift occurs relatively largely.

Patent Publication 2 relates to a dynamometer device in which a test piece connected to the dynamometer is received in an environmental tank in order to conduct the test by exposing the test piece to under extremely high temperatures or under extremely low temperatures. It discloses a configuration in which a heat insulation wall equipped with a hole through which the rotation shaft passes is provided between the test piece and the dynamometer, and a cooling wind is supplied to around this heat insulation wall through an air duct.

Furthermore, Patent Publication 3 discloses a dynamometer device in which a temperature-controlled wind is applied to the torque meter by a blower, and a heat insulator is interposed between the torque meter and an intermediate shaft that is supported by an intermediate shaft bearing.

A dynamometer equipped with an electric motor as a main component generates heat during the test operation to cause considerably high temperatures even if it is equipped with an air-cooling or liquid-cooling cooling mechanism. Then, heat of the electric motor is transmitted to the torque meter through the main shaft and the flange coupling as metal parts, thereby heating the torque meter. In particular, in recent years, due to downsizing of the dynamometer device, there is a tendency that the torque meter is positioned closer to the electric motor in the dynamometer in the axial direction. Therefore, the effect of heat of the dynamometer on the torque meter becomes that much.

The technique of Patent Publication 2 does not deal with such heat transmitted from the dynamometer (electric motor) through the main shaft. The technique of Patent Publication 2 only eliminates the effect of heat from the environmental tank. Therefore, heat transmission from the dynamometer makes it difficult to maintain the torque meter at low temperatures, even if a cooling wind is supplied toward the heat insulation wall between the environmental tank and there as in Patent Publication 2.

On the other hand, Patent Publication 3 makes a heat insulation material interposed between an intermediate shaft and a torque meter. In this manner, if a heat insulation material is interposed, the length of the entirety of the rotation shaft becomes longer by the thickness of the heat insulation material, thereby lowering the allowable maximum rotation speed of the dynamometer device. Furthermore, the heat insulation material is lower in rigidity as compared with metal members. Therefore, if a thick heat insulation material is interposed, concentricity between the rotation center axis of the intermediate shaft and the rotation center axis of the torque meter side tends to lower.

Therefore, it is an object of this invention to maintain the torque meter at a temperature that is closer to ordinary temperature by suppressing the effect of heat that is transmitted from an electric motor of the dynamometer to the torque meter, without having adverse effects such as lowering of the allowable rotation speed.

PRIOR ART PUBLICATIONS

Patent Publications

Patent Publication 1: JP Patent Application Publication 2003-130751
Patent Publication 2: JP Patent Application Publication 2013-130557
Patent Publication 3: JP Patent Application Publication 2013-210202

SUMMARY OF THE INVENTION

A dynamometer device according to this invention is characterized by comprising:
a dynamometer in which a tip end of a main shaft projects from a housing;
a torque meter that is disposed between the main shaft and a test-piece connection section;
a heat insulation plate that is interposed between two flange surfaces in any flange coupling positioned between the main shaft and the torque meter;
a thermally sprayed ceramic layer provided on at least one flange surface that is in contact with the heat insulation plate;
a cover that is formed to surround at least a periphery of the torque meter between an end surface of the housing and the test-piece connection section; and
an air conditioner that supplies a temperature-controlled wind to an inside space of the cover.

In this configuration, an interposal of the heat insulation plate between the flange surfaces makes the heat transmission area therebetween smaller and quantity of heat transmitted to the torque meter through the main shaft smaller. Furthermore, the thermally sprayed ceramic layer achieves heat insulation more assuredly. Then, the air conditioner supplies a temperature-controlled wind (cool wind or warm wind) to the space in the cover surrounding the periphery of the torque meter that is insulated from the main shaft in such manner. Therefore, for example, it is possible to effectively cool the torque meter by cool wind. With this, it is possible to become closer to the standard temperature of the torque meter, for example, ordinary temperature (e.g., 25° C.).

The air conditioner is preferably one capable of generating and supplying a cool wind of a temperature that is lower than the outdoor temperature and a warm wind by utilizing a refrigeration cycle in which refrigerant is circulated.

In one mode, the air conditioner is such that temperature of the temperature-controlled wind is controlled in accordance with the torque meter's detection temperature.

In the present invention, a combination of the heat insulation plate and the thermally sprayed ceramic layer is used as a heat insulation element. With this, the thickness of the heat insulation plate becomes relatively thinner as compared with a desired heat insulation capability. Therefore, it suppresses the increase of the length of the entirety of the rotation shaft that is caused by adding a heat insulation element, and it is possible to suppress lowering of the allowable maximum rotation speed of the dynamometer device. By making the thickness of the heat insulation plate thin, it is possible to suppress lowering of concentricity of the front and rear rotation shafts.

In one specific mode of the present invention, the torque meter is equipped with a pair of flanges;

the heat insulation plate is disposed between a flange surface of a first rotation member at a tip end section of the main shaft and a flange surface of a second rotation member to which one of the flanges of the torque meter is attached; and the first rotation member and the second rotation member are connected with each other by a plurality of bolts that pass through the heat insulation plate.

More preferably, the heat insulation plate is formed into a ring shape to have a circular opening section at a center thereof, and a circular projection section formed on an inner peripheral part of one of the first rotation member and the second rotation member and a circular recess section formed on an inner peripheral part of the other are fit to each other through the opening section.

With this, concentricity of the first rotation member and the second rotation member is maintained, irrespective of the heat insulation plate. Therefore, the above-mentioned bolts passing through the heat insulation plate rigidly connect the first rotation member and the second rotation member. This makes it possible to achieve a secure torque transmission.

Furthermore, in one preferable mode of the present invention, the thermally sprayed ceramic layer is provided on at least one contact surface of the projection section and the recess section that are fit to each other. This thermally sprayed ceramic layer makes it possible to obtain a heat insulation action even on the contact surface of the projection section and the recess section.

Preferably, the cover extends from the end surface of the housing to a front end surface of the test-piece connection section, and the cover is formed at a front wall along a front end surface of the test-piece connection section with a circular opening section through which the test-piece connection section is exposed. With this, the inside space of the cover to which the cool wind is supplied is assuredly separated from the outside, thereby achieving an effective cooling by the cool wind of a relatively small amount.

Furthermore, it is optional to provide a second heat insulation plate at any flange coupling that is positioned on a side of the test-piece connection section of the torque meter. For example, in the case of a test piece of which temperature increases during the test, it is preferable to add the second heat insulation plate.

According to this invention, it is possible to make temperature of the torque meter closer to ordinary temperature without having lowering of the allowable maximum rotation speed, the temperature drift calibration becomes easy, and reliability of the torque meter measurement values improves.

MODE FOR IMPLEMENTING THE INVENTION

In the following, one embodiment of this invention is explained in detail with reference to the drawings.

Figure 1:
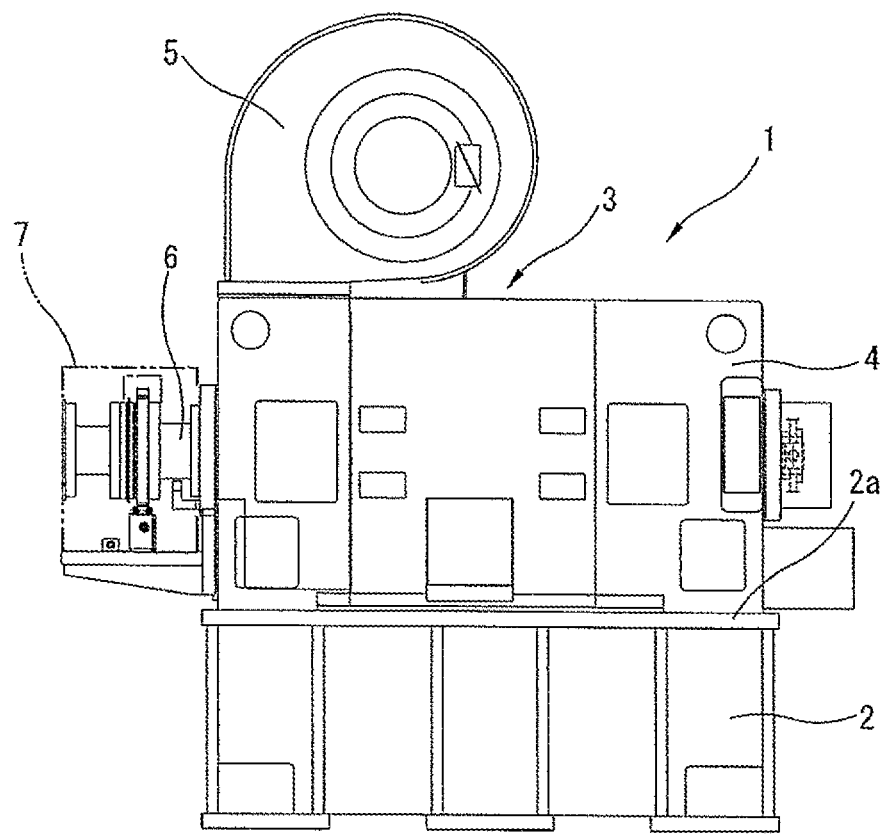
FIG. 1 is a side view of a dynamometer device as a whole of one embodiment of the present invention.

FIG. 1 is a side view showing one embodiment of a dynamometer device 1 according to this invention. This dynamometer device 1 is equipped with a dynamometer 3 that is mounted on a bed 2a on an upper end of a base 2 to have a posture in which the rotation shaft is horizontal.

The dynamometer 3 is configured such that a box-shape housing 4 surrounds an electric motor in the inside, and is formed on the top surface of the housing 4 with a blower fan 5 that takes in and supplies the outside air to the inside of the housing 4, for example, as an air-cooling type cooling mechanism to cool the electric motor in the inside.

A tip end of the rotation shaft of the dynamometer 3, that is, a main shaft 6, projects from the front end surface of the housing 4. To cover this tip end part of the main shaft 6, a rectangular box-shape cover 7 is attached to the front end surface of the housing 4. In FIG. 1, the cover 7 is shown by an imaginary line to show an inside configuration.

Figure 2:
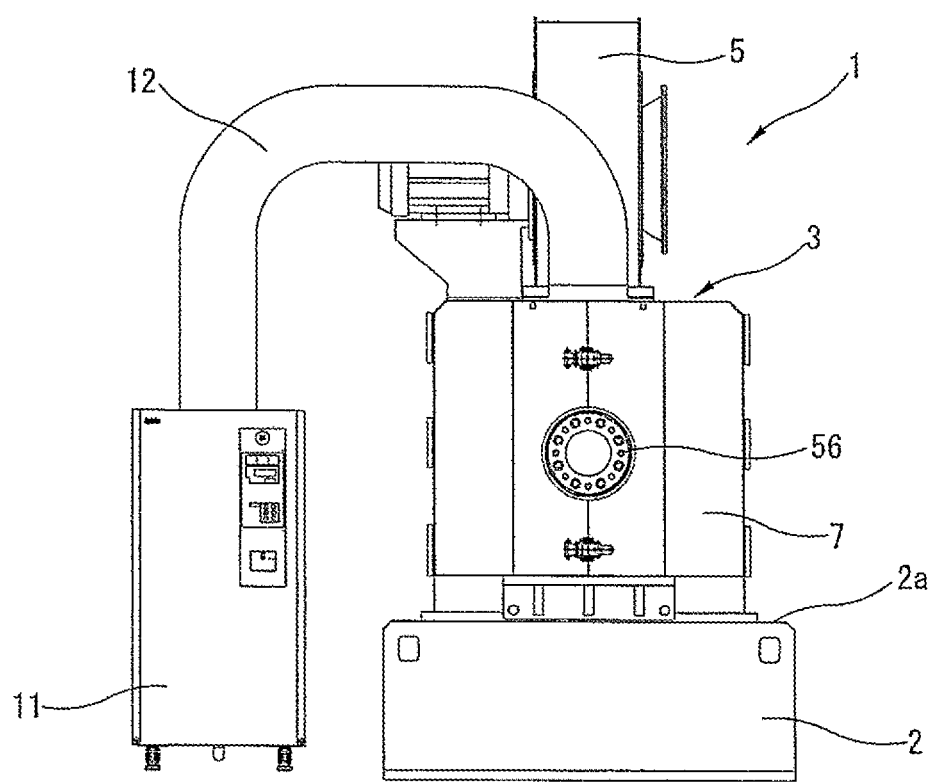
FIG. 2 is a front view of the dynamometer device containing an air conditioner.
Figure 3:
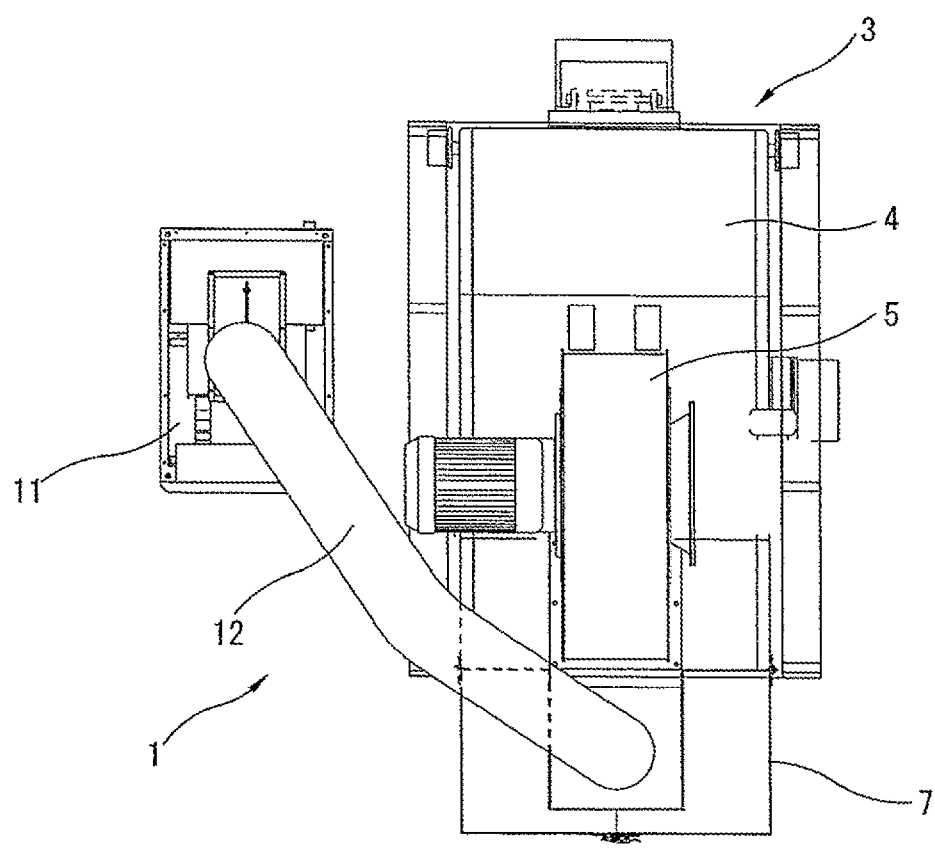
FIG. 3 is a plan view of the dynamometer device containing the air conditioner.

FIG. 2 and FIG. 3 show a configuration of a front end section of the dynamometer device 1. As shown in these drawings, the dynamometer device 1 is equipped with a portable air conditioner 11 that is placed apart from the dynamometer 3. This air conditioner 11 utilizes a so-called refrigeration cycle with refrigerant's compression and expansion to generate a cool wind having a temperature lower than the outside temperature or a warm wind having a temperature higher than the outside temperature and then send the wind by an inside fan. A wind exit disposed on the top surface is connected to the top surface of the cover 7 via a wind supply duct 12. With this, a temperature-controlled wind (cool wind or warm wind) is supplied to the inside space of the cover 7. To introduce the temperature-controlled wind into the inside space of the cover 7 from the top surface in a vertically downward direction, a tip end section of the wind supply duct 12 is almost vertically connected to the top surface of the cover 7. The air conditioner 11 may be integrated with the base 2 or the like of the dynamometer 3. In this embodiment, however, it is separately installed on the floor alongside the dynamometer 3 to avoid heat from the dynamometer 3 as much as possible.

The air conditioner 11 is basically configured to continuously send air with a constant air flow rate. It is variably controlled in accordance with the torque meter's detection temperature such that the temperature-controlled wind's temperature (outlet temperature) makes the after-mentioned torque meter's temperature closer to the target temperature (e.g., 25° C.).

Figure 4:
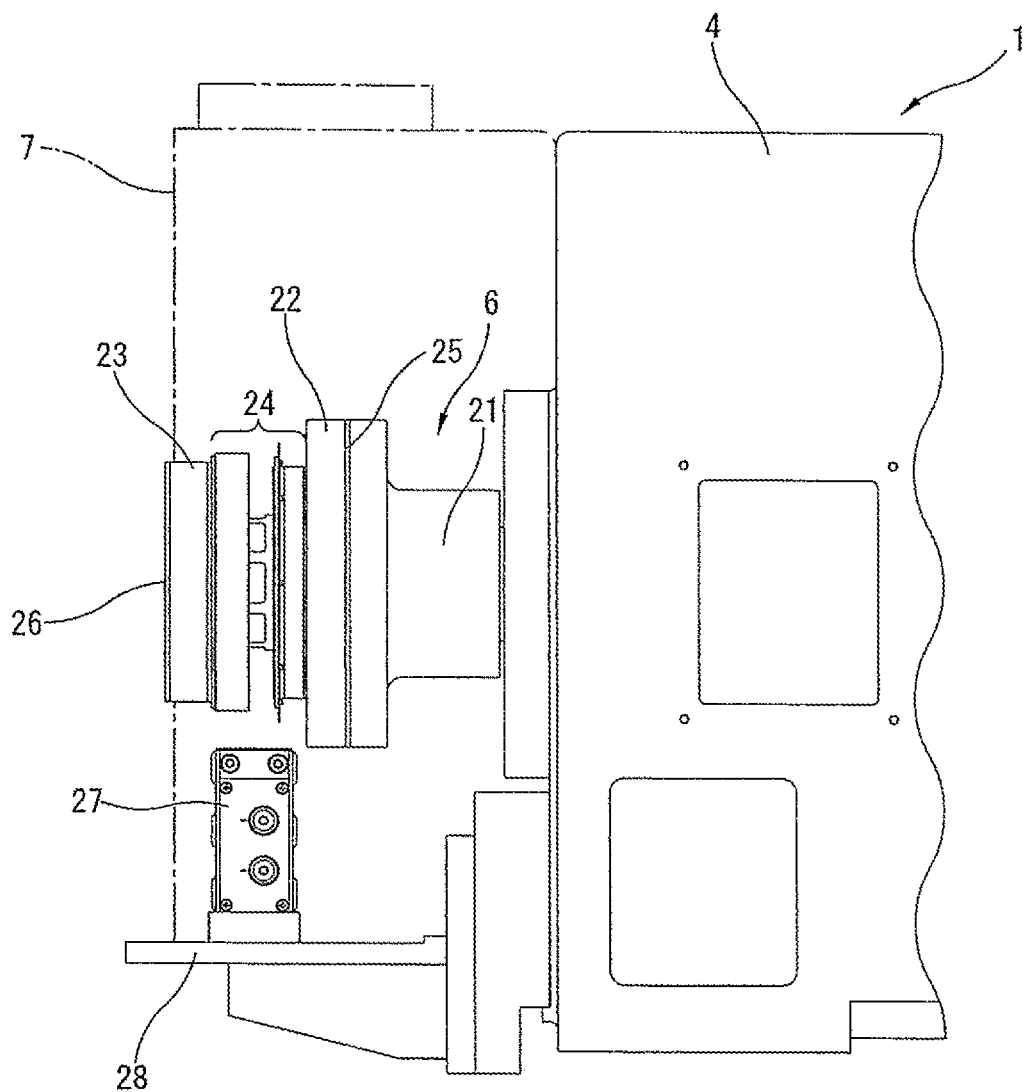
FIG. 4 is an enlarged view of a front end section of the dynamometer device, which is shown after removing a cover.
Figure 5:
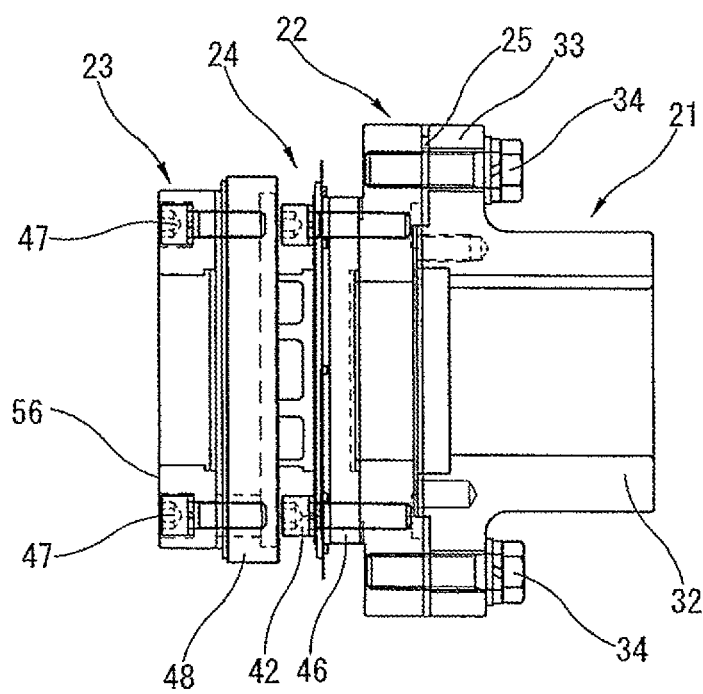
FIG. 5 is a sectional view of a main shaft tip end section containing a torque meter.

FIG. 4 is an enlarged view showing details of the configuration of the tip end part of the main shaft 6 of the dynamometer 3, which is covered with the cover 7. As shown in the drawing, the tip end part of the main shaft 6 is constituted of a plurality of flanged members. These are connected with each other as flange coupling. Specifically, the tip end part of the main shaft 6 is equipped with a coupling 21 (first rotation member) that is attached to a tip end of a rotation shaft of the electric motor, a disk-shaped adapter flange 22 (second rotation member) that is attached to the coupling 21, a disk-shaped coupling flange 23 that constitutes the test-piece connection section, a torque meter 24 that is disposed between the adapter flange 22 and the coupling flange 23, a heat insulation plate 25 that is sandwiched between the coupling 21 and the adapter flange 22, and a second heat insulation plate 26 that is added to a test-piece connection surface of the coupling flange 23. FIG. 5 is a sectional view showing a connection condition of these members (except the second heat insulation plate 26).

At a position below the torque meter 24, there is disposed a stator 27 that receives the detection signals radio-transmitted from the torque meter 24 and makes output to an outside operation measurement unit (computer). This stator section 27 is configured to surround a part of the periphery of the torque meter 24 and is supported on a supporting base 28 that is attached to a front end surface of the housing 4. The cover 7 together with this supporting base 28 surrounds a periphery of a range having a length from the front end surface of the housing 4 to the vicinity of the end surface of the second heat insulation plate 26.

Figure 6:
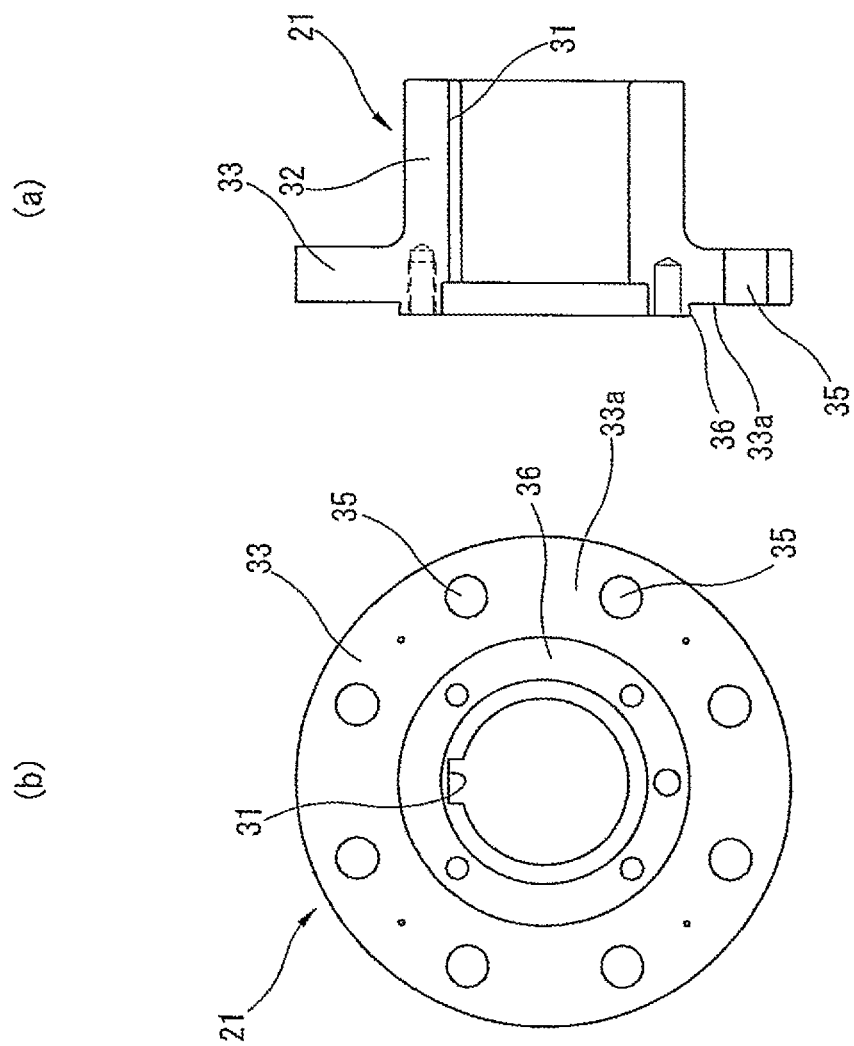
FIGS. 6(a) and 6(b) are respectively a sectional view and a left side view of a coupling.

As shown in FIG. 6, the coupling 21 is equipped with a cylindrical section 32 that is connected to a rotation shaft of the electric motor through a keyway 31, and a disk-shaped flange section 33. At the flange section 33, a plurality of circular bolt through holes 35, through which bolts 34 (see FIG. 5) for making a connection with the adapter flange 22 pass, are equidistantly disposed along the circumferential direction. Here, an inner peripheral part of the flange section 33 projects slightly in the axial direction as a stepped section 36. An outer peripheral part that is outside of this stepped section 36 serves as an annular flange surface 33a that is brought into contact with the heat insulation plate 25.

Figure 7:
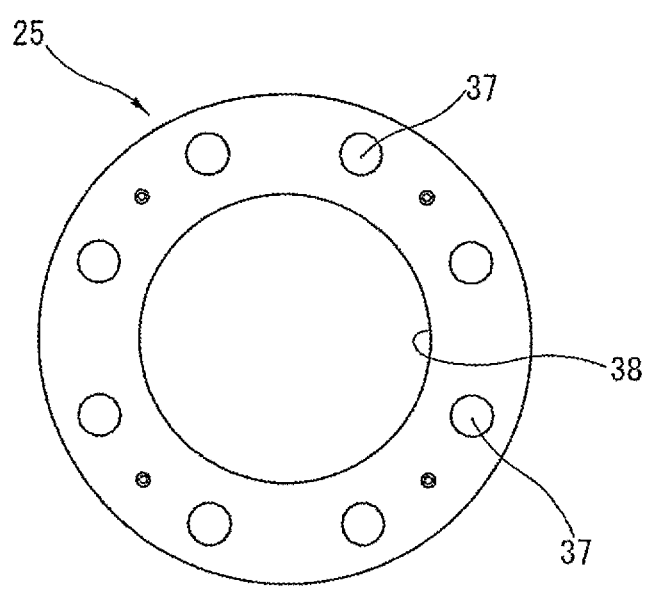
FIG. 7 is a plan view of a heat insulation plate.

The heat insulation plate 25 is a nonmetallic heat insulation plate that is sold commercially as a so-called high-strength heat-insulation plate that is high in heat insulation and strength. As shown in FIG. 7, it is formed into an annular shape corresponding to the flange surface 33a. A plurality of bolt through holes 37 are opened therethrough to correspond to the bolt through holes 35 of the coupling 21. Here, the inside diameter of the heat insulation plate 25, that is, the diameter of a circular opening section 38, corresponds to the diameter of the stepped section 36 of the coupling 21. This opening section 38 is relatively closely fit onto the stepped section 36, thereby positioning the heat insulation plate 25.

Figure 8:
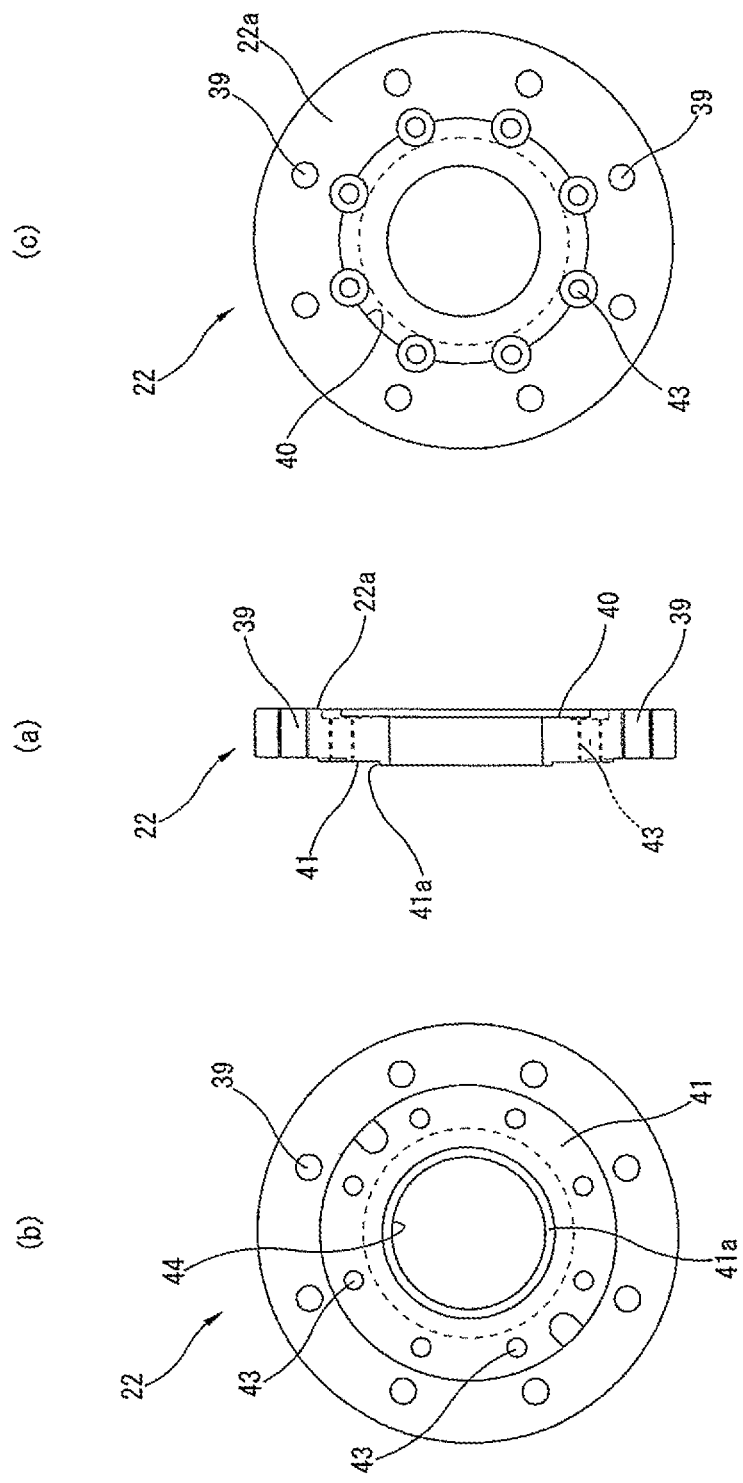
FIGS. 8(a), 8(b) and 8(c) are respectively a sectional view, a left side view and a right side view of an adapter flange.

As shown in FIG. 8, the adapter flange 22 has an annular shape that is equipped at its center with an opening section 44. It is equipped at its outer peripheral section with a plurality of screw holes 39 with which the bolts are threadedly engaged. This outer peripheral section including the screw holes 39 serves as an annular flange surface 22a that is brought into contact with the heat insulation plate 25. Furthermore, on the surface on the side of the coupling 21 shown in FIG. 8(*c*), a circular recess section 40, into which a tip end surface of the stepped section 36 is fit, is formed on the inner peripheral part to correspond to the stepped section 36 of the coupling 21. Furthermore, on the surface on the side of the torque meter shown in FIG. 8(*b*), a torque meter attaching seat surface 41 is formed into an annular shape, and a plurality of screw holes 43, with which bolts 42 (see FIG. 5) for attaching the torque meter 24 are threadedly engaged, are formed.

As shown in FIG. 5, the coupling 21 and the adapter flange 22 are firmly coupled by the bolts 34 in a condition that the heat insulation plate 25 is interposed between their respective flange surfaces 33a, 22a. In this coupled condition, the outer peripheral surface of the stepped section 36 of the coupling 21 is fit with the inner peripheral surface of the recess section 40 of the adapter flange 22 with a high precision. This fitting of these makes a mutual centering between the coupling 21 and the adapter flange 22. That is, concentricity between the coupling 21 and the adapter flange 22 is secured by the fitting between the stepped section 36 and the recess section 40, not depending on the heat insulation plate 25 or the bolts 34. Therefore, concentricity between the coupling 21 and the adapter flange 22 and parallelism between the flange surfaces 33a, 22a of these are assuredly obtained by fastening each of the bolts 34 with a specified torque. The tip end surface of the stepped section 36 and the bottom surface of the recess section 40 are very slightly spaced away from each other with no contact therebetween.

Here, at least one of the flange surfaces 33a, 22a to be in contact with the heat insulation plate 25 is formed with a thermally sprayed ceramic layer that serves as a heat insulation layer by a ceramic thermal spraying. In one embodiment, the flange surface 33a on the side of the coupling 21 is formed with a thermally sprayed ceramic layer that is made of zirconia and has a thickness of 0.5 mm. This thermally sprayed ceramic layer is continuously provided from the inner peripheral edge of the flange surface 33a to the outer peripheral surface of the stepped section 36. As mentioned above, the outer peripheral surface of the stepped section 36 is fit with the inner peripheral surface of the recess section 40 of the adapter flange 22. Their dimensions are designed in consideration of the thickness (0.5 mm) of this thermally sprayed ceramic layer. That is, the inner peripheral surface of the recess section 40 is fit with a high precision onto the thermally sprayed ceramic layer on the outer peripheral surface of the stepped section 36.

More specifically, the thermally sprayed ceramic layer is formed by conducting a ceramic thermal spaying to have a thickness, for example, of around 0.7 mm on both of the flange surface 33a and the outer peripheral surface of the stepped section 36 and then grinding such that the external form including the thermally sprayed ceramic layer has specified dimensions. The thickness of the thermally sprayed ceramic layer after this grinding is 0.5 mm as the designed value. Therefore, the actual dimensions after the grinding of the outer peripheral surface of the stepped section 36 correspond to the diameter of the recess section 40, thereby obtaining a fitting condition with a high precision with the inner peripheral surface of the recess section 40. It is optional to use another ceramic material, such as alumina or titania, as the thermal spray material, to constitute the thermally sprayed ceramic layer.

In this manner, the heat insulation plate 25 and the thermally sprayed ceramic layer as the heat insulation elements are interposed between the coupling 21 and the adapter flange 22. With this, transmission of heat, which has been transmitted from the electric motor to the coupling 21, to the adapter flange 22 is limited. That is, the heat transmission pathway between the coupling 21 and the adapter flange 22 is only the bolts 34, thereby decreasing the substantial heat transmission area.

In particular, the use of a combination of the heat insulation plate 25 and the thermally sprayed ceramic layer as the heat insulation elements makes the thickness of the heat insulation plate 25 relatively thinner as compared with a desired heat insulation capability. If it is tried to obtain the desired heat insulation capability by only the heating insulation plate, the heat insulation plate becomes thicker. With this, the length of the entirety of the rotation shaft projecting from the dynamometer 3 becomes longer, thereby lowering the allowable maximum rotation speed of the dynamometer device 1. Furthermore, the heat insulation plate is lower in rigidity as compared with metal members. Therefore, it lowers concentricity. Similarly, it causes lowering of the allowable maximum rotation speed or lowering of the measurement precision. In the above embodiment, such defect is minimized by combining the heat insulation plate 25 with the thermally sprayed ceramic layer.

Moreover, as mentioned above, the stepped section 36 of the coupling 21, which is high in rigidity, and the recess section 40 of the adapter flange 22 are fit with each other without having the heat insulation plate 25 therebetween. Therefore, even if it is equipped with the heat insulation plate 25, it is possible to connect the coupling 21 and the adapter flange 22 in a concentric condition with a high precision. Furthermore, in the above embodiment, the thermally sprayed ceramic layer is also interposed between the fitting surfaces of these, thereby minimizing heat transfer therebetween.

Figure 9:
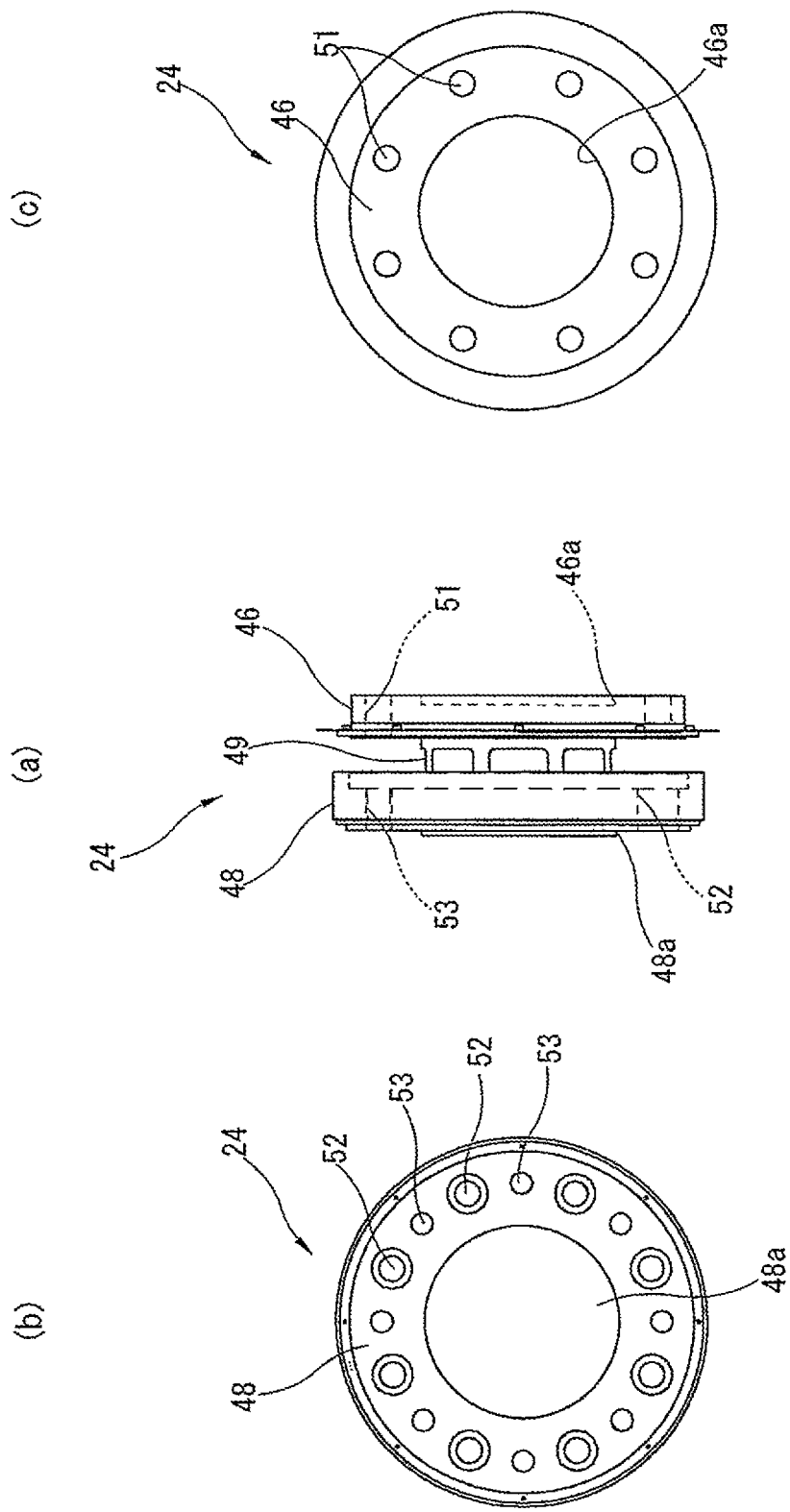
FIGS. 9(a), 9(b) and 9(c) are respectively a front view, a left side view and a right side view of a torque meter.

The torque meter 24 is one that is sold commercially as a so-called noncontact flange-type torque meter. As shown in FIG. 9, it is equipped with a disk-shaped first flange 46 that is fixed to the adapter flange 22 by a plurality of bolts 42 (see FIG. 5), a disk-shaped second flange 48 that is fixed to the coupling flange 23 by a plurality of bolts 47 (see FIG. 5), and a sensor section 49 therebetween. The sensor section 49 detects torque acting between the first flange 46 and the second flange 48, and outputs the detection signals to the stator section 27 (see FIG. 4) in a noncontact manner, as mentioned above. In order to conduct the temperature drift calibration, the sensor section 49 contains a temperature sensor that detects temperature of the torque meter 24 itself, and similarly the temperature signals are output to the stator section 27. As mentioned above, the air conditioner 11 is such that the blow temperature is variably controlled in accordance with the temperature of this torque meter 24. Besides the temperature sensor of the torque meter 24 itself, it is optional to have a configuration that a temperature sensor to detect the temperature in the inside of the cover 7 or the temperature around the torque meter 24 is provided, and the air conditioner 11 is controlled based on the detected temperature.

The first flange 46 of the torque meter 24 has a plurality of bolt through holes 51 equidistantly along the circumferential direction and is fixed to the torque meter attaching seat surface 41 of the adapter flange 22 by the bolts 42 that pass through the bolt through holes 51 and threadedly engage into the screw holes 43 of the adapter flange 22. A stepped section 41a (see FIG. 8(a)) that is annularly provided at an inner periphery of the torque meter attaching seat surface 41 of the adapter flange 22 is fit into a circular recess section 46a (see FIG. 9(c)) of the first flange 46, thereby making a mutual centering of these.

The second flange 48 of the torque meter 24 is equipped with a plurality of circular through holes 52 that allow the bolts 42 to pass through, and a plurality of screw holes 53 into which the bolts 47 to connect the second flange 48 and the coupling flange 23 are threadedly engaged. The through holes 52 and the screw holes 53 are alternately disposed in the circumferential direction.

Figure 10:
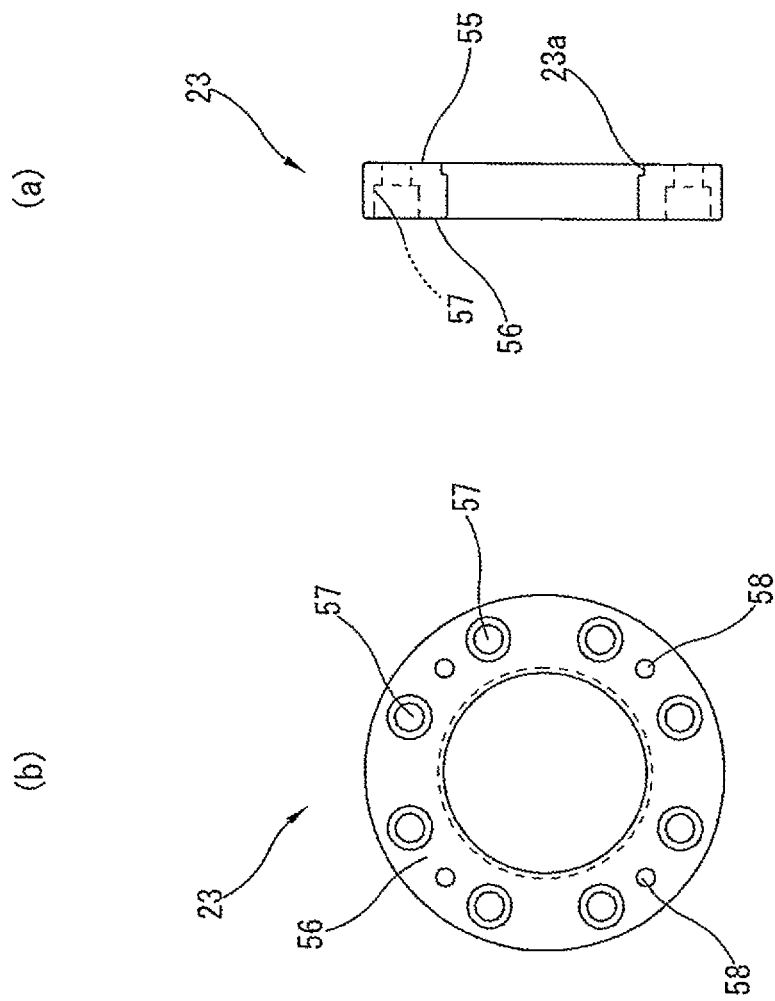
FIGS. 10(a) and 10(b) are respectively a sectional view and a left side view of a coupling flange.

As shown in FIG. 10, the coupling flange 23 is equipped on its one side with a flat torque-meter attaching seat surface 55 and on the other side with a flat test-piece connection surface 56. Furthermore, it has a plurality of stepped bolt through holes 57 equidistantly in a circumferential direction, and the coupling flange 23 is fixed to the second flange 48 by the bolts 47 that are threadedly engaged into the screw holes 53 of the second flange 48 of the torque meter 24 through the bolt through holes 57. As shown in FIG. 5, the head section of the bolt 47 is positioned in the stepped bolt through hole 57 and does not project from the test-piece connection surface 56. A stepped section 48a (see FIG. 9(a)) that is annularly provided on the inner periphery of the second flange 48 is fit into a recess section 23a that is provided on a circular opening section inner periphery of the coupling flange 23, thereby making a mutual centering of these.

Furthermore, the test-piece connection surface 56 of the coupling flange 23 is provided with a plurality of screw bolts 58 for fixing a test piece not shown in the drawings directly or through a suitable jig. The second heat insulation plate 26 (see FIG. 4) is a high-strength heat insulation plate similar to the heat insulation plate 25 and is interposed between the test-piece connection surface 56 and the test piece or the jig.

The air conditioner 11 supplies cool wind (or warm wind) into an inside space of the cover 7. As shown in FIG. 11 to FIG. 14, the cover 7 is constituted of a fixed top wall 62 at the center of the top surface that has an air supply opening 61, to which the wind supply duct 12 is connected from the air conditioner 11, and a pair of movable halves 64A, 64B configured to be openable left and right through a plurality of hinges at the front end sections of the housing 4. The fixed top wall 62 is rectangular in plan view and is positioned immediately above the above-mentioned coupling 21, torque meter 24, etc.

The pair of movable halves 64A, 64B is basically mutually symmetrically structured. Each of them is equipped with a side wall 65 that constitutes a side wall surface of the cover 7, a top wall 66 that is provided along the upper edge of the side wall 65 to constitute the top surface of the cover 7 with the fixed top wall 62, a bottom wall 67 that is provided along the lower edge of the side wall 65 to constitute the bottom surface of the cover 7 to be continuous to the side edge of the supporting base 28, a first front surface wall 68 that is formed to reach one edge of the top wall 66, one edge of the bottom wall 67 and a side edge of the side wall 65 to constitute a part of the front surface of the cover 7, and a second front wall 69 that is stacked on the front surface of this first front wall 68. In the drawings, each section of one movable half 64A is designated by a sign with "A", and each section of the other movable half 64B is designated by a sign with "B". In the following explanation, only when it is necessary to distinguish the left and right halves, the reference numerals are provided with "A" and "B" in the explanation.

Figure 11:
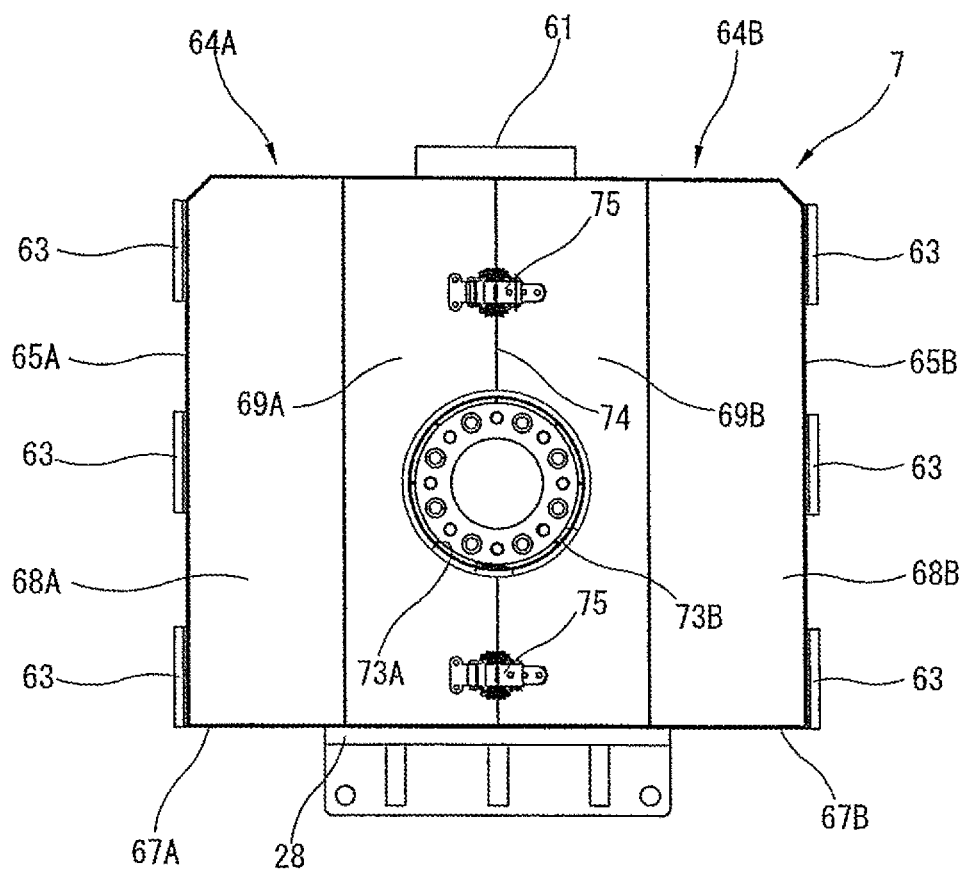
FIG. 11 is a front view of a cover.

Under a normal use condition, the cover 7 is formed into a rectangular box-shape and generally a square in front view (see FIG. 11). The side wall 65 linked by the hinges 63 is formed into a vertically elongated rectangle having three sides to which the top wall 66, the bottom wall 67 and the first front wall 68 are connected. The second front surface wall 69 is transversely slidably engaged at its upper edge section 71 and lower edge section 72, each of which is bent to have an L-shaped section, with an upper edge and a lower edge of the first front wall 68. As shown in FIG. 11, the left and right second front walls 69 as a pair are in abutment with each other at a mating surface 74 on the center line of the main shaft 6. Under this abutment condition with each other, they are fixed to each other by upper and lower latch mechanisms 75. A circular opening 73 corresponding to the above-mentioned test-piece connection surface 56 is formed across the pair of second front walls 69. That is, the second front walls 69 are respectively formed with semicircular cutout sections 73A, 73B that are symmetric. The test-piece connection surface 56 is exposed to the outside through the circular opening 73 (cutout sections 73A, 73B). Basically, it is possible to attach and detach the test-piece without opening the cover 7.

Although not shown in the drawings, it is preferable to apply a heat insulation treatment, such as sticking of a heat insulation material, or heat insulation layer's formation by a ceramic thermal spraying, to an inner wall surface of each section of the cover 7, which is formed of metal plates. It is preferable to apply a heat shielding treatment, such as sticking of a heat resisting sheet, or heat resisting coating, to the outer surface of each section of the cover 7. Furthermore, the cover 7 shown as an example in the drawings is not equipped with an exhaust port for discharging the temperature-controlled wind supplied from the air conditioner 11 to the outside after the heat exchange with the torque meter 24, etc., but is configured to conduct the discharge to the outside from gaps of each section. According to need, it is optional to form an exhaust port, for example, at a lower part of the side wall 65.

Figure 12:
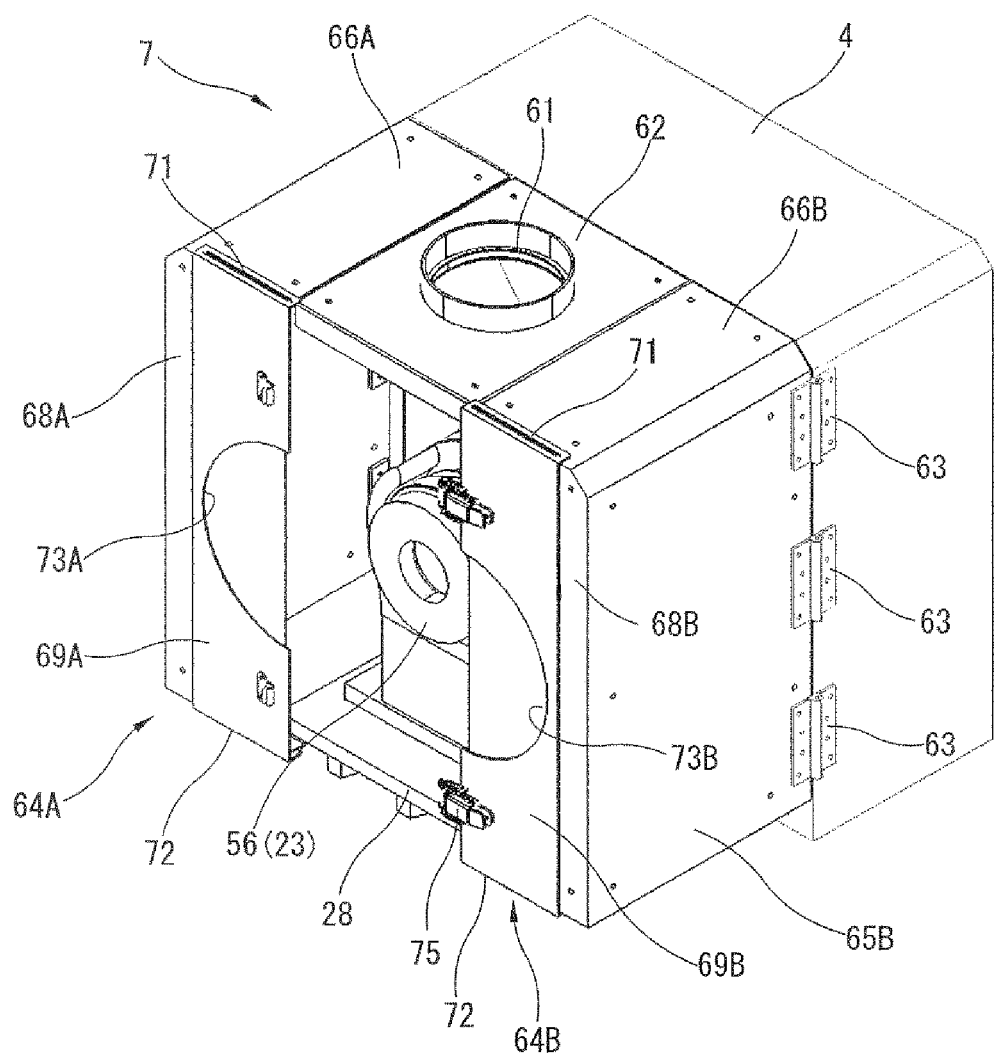
FIG. 12 is an explanatory view showing a condition in which second front walls of the cover have been slid.
Figure 13:
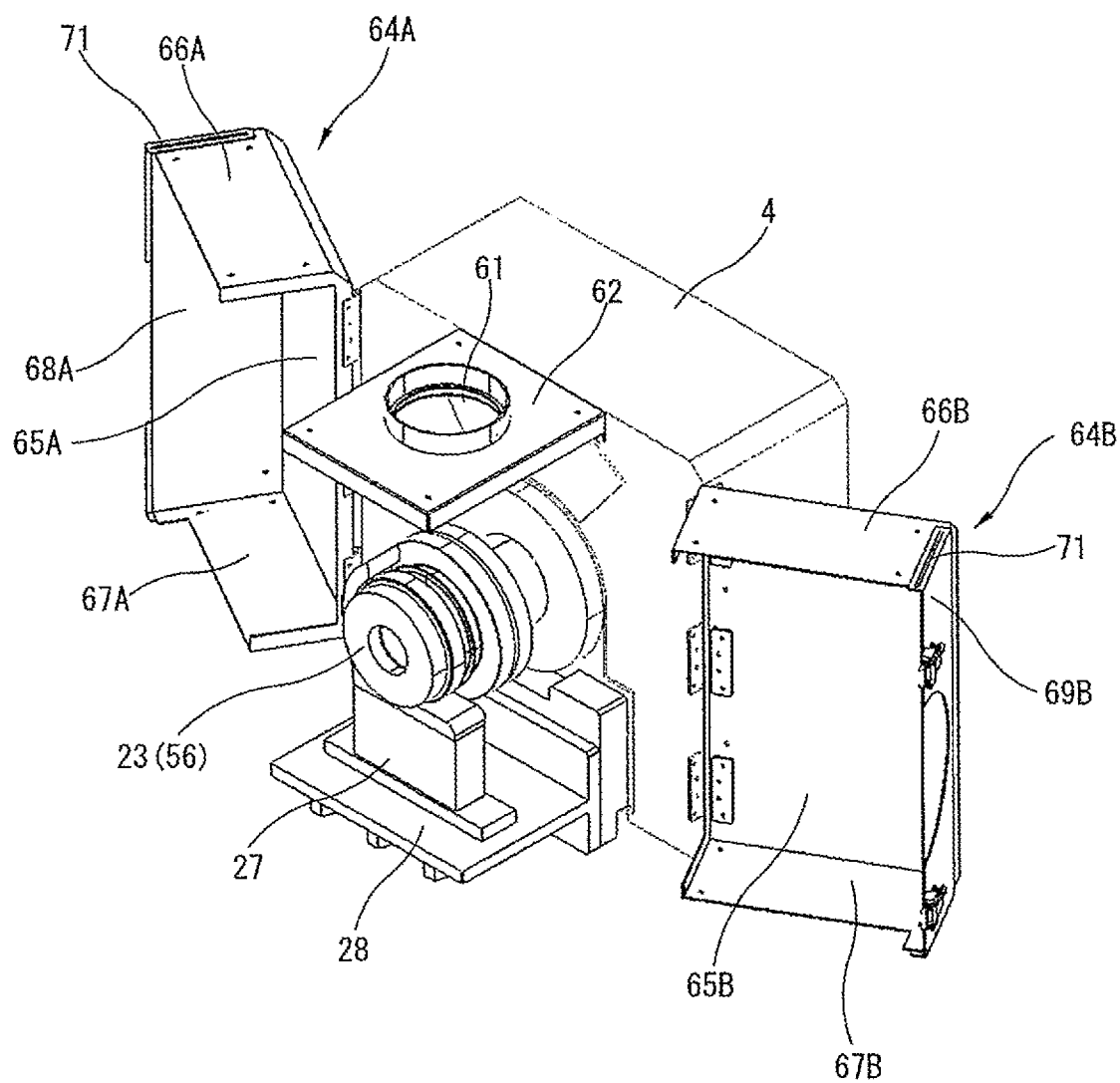
FIG. 13 is an explanatory view showing a condition of an intermediate stage in which the cover has been opened left and right.
Figure 14:
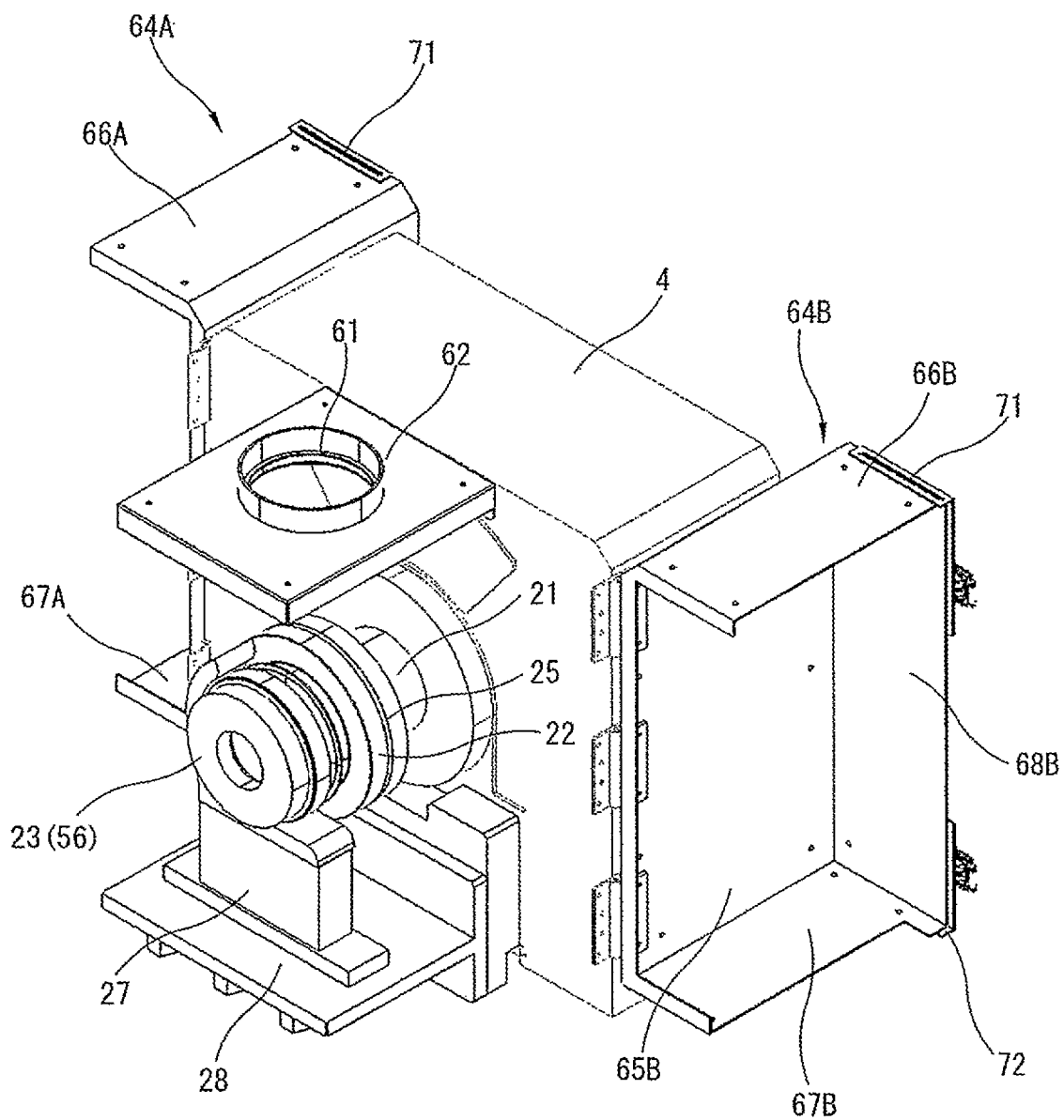
FIG. 14 is an explanatory view showing a condition in which the cover has been fully opened.

Under a normal use, the cover 7 is closed, and various tests and measurements of the test piece are conducted in a condition that the cover surrounds the periphery of the torque meter 24, etc. For example, when conducting maintenance of the torque meter 24, etc., according to need, it is possible to open the cover 7. FIG. 12 to FIG. 14 show an action or operation procedure when opening the cover 7. At first, the latch mechanisms 75 on the front end surface are turned into an unlocked condition. Then, as shown in FIG. 12, the second front surface walls 69 are linearly slid to the left and the right to open the same. The width of the second front surface wall 69 in the transverse direction is designed to be generally the same as the width of the first front surface wall 68 in the transverse direction. Therefore, like FIG. 12, it turns into a condition in which the second front surface walls 69 are lapped over the first front surface walls 68.

Then, from this condition of FIG. 12, the movable halves 64A, 64B as a pair are rotated about the hinges 63 to open the same to the left and the right. FIG. 13 shows a condition in which the movable halves 64A, 64B have been opened to middle angles. Here, prior to rotating the movable halves 64A, 64B, the second front surface walls 69 have retreated to the left and the right as mentioned above. Therefore, the semicircular cutout sections 73A, 73B do not interfere with the coupling flange 23. Furthermore, even in a condition that some test piece is attached to the test-piece connection surface 56, it is possible to open and close the movable halves 64A, 64B without interference with the test piece unless the test piece is particularly large.

FIG. 14 shows a condition in which at last the movable halves 64A, 64B have rotated by 180 degrees to fully open the cover 7. Although it is not specifically shown in the drawings, it is optional to attach permanent magnets to the side walls 65 of the movable halves 64A, 64B or the corresponding side wall surfaces of the housing 4 to hold the movable halves 64A, 64B fully opened as in FIG. 14.

In this manner, in the embodiment shown in the drawings, it is possible to easily open and close the cover 7. By fully opening the cover 7, it is possible to expose the periphery of the coupling 21, etc. to the vicinity of the front end surface of the housing 4. Therefore, it leads to the improved workability of checking or maintenance of the torque meter 24 or fastening operation of each part using a torque wrench, etc.

As mentioned above, in the dynamometer device 1 of the above-mentioned embodiment, under a normal use, the periphery of the torque meter 24 is surrounded by the cover 7, and the air conditioner 11 supplies cool wind or warm wind into the inside space of this cover 7. Then, heat transfer between the rotation shaft of the electric motor as a heat generating body and the torque meter 24 is greatly limited by the heat insulation plate 25. Therefore, it is possible to effectively cool or heat the torque meter 24 by the cool wind or warm wind supplied from the air conditioner 11 and to make the torque meter 24 closer to ordinary temperature (e.g., 25° C.). With this, the temperature drift of the torque meter 24 is restrained to be relatively small, its calibration becomes easy, and reliability of the measured values after the calibration is improved.

Furthermore, the coupling 21 and the adapter flange 22 are firmly connected to each other by the direct fitting and contact between the stepped section 36 of the coupling 21 and the recess section 40 and by a plurality of the bolts 34. Therefore, it does not cause lowering of credibility of the torque measured values by elastic deformation of the heat insulation plate 25, the angular displacement of the rotation center axes of both, etc.

In the above-mentioned embodiment, the heat insulation plate 25 is disposed between the coupling 21 and the adapter flange 22, but the present invention is not limited to the configuration of this embodiment. For example, in a configuration not equipped with the adapter flange 22, it is optional to dispose the heat insulation plate 25 between the coupling 21 and the first flange 46 of the torque meter 24. In a configuration in which more flange members are coupled, it is possible to dispose the heat insulation plate 25 at another suitable position.

The invention claimed is:
1. A dynamometer device comprising:
a dynamometer in which a tip end of a main shaft projects from a housing;
a torque meter that is disposed between the main shaft and a test-piece connection section;
a heat insulation plate as a separate member that is inserted between two flange surfaces in any flange coupling positioned between the main shaft and the torque meter;

a thermally sprayed ceramic layer provided on at least one flange surface that is in contact with the heat insulation plate wherein the thermally sprayed ceramic layer enables the heat insulation plate to be thin;
a cover that is formed to surround at least a periphery of the torque meter between an end surface of the housing and the test-piece connection section; and
an air conditioner that supplies a temperature-controlled wind to an inside space of the cover.

2. The dynamometer device as claimed in claim 1, wherein the torque meter is equipped with a pair of flanges;
wherein the heat insulation plate is disposed between a flange surface of a first rotation member at a tip end section of the main shaft and a flange surface of a second rotation member to which one of the flanges of the torque member is attached; and
wherein the first rotation member and the second rotation member are connected with each other by a plurality of bolts that pass through the heat insulation plate.

3. The dynamometer device as claimed in claim 2, wherein the heat insulation plate is formed into a ring shape to have a circular opening section at a center thereof; and
wherein a circular projection section formed on an inner peripheral part of one of the first rotation member and the second rotation member and a circular recess section formed on an inner peripheral part of the other are fit to each other through the opening section.

4. The dynamometer device as claimed in claim 3, wherein the thermally sprayed ceramic layer is provided on at least one contact surface of the projection section and the recess section that are fit to each other.

5. The dynamometer device as claimed in claim 1, wherein the cover extends from the end surface of the housing to a front end surface of the test-piece connection section; and
wherein the cover is formed at a front wall along a front end surface of the test-piece connection section with a circular opening section through which the test-piece connection section is exposed.

6. The dynamometer device as claimed in claim 5, wherein the torque meter is equipped with a pair of flanges;
wherein the heat insulation plate is disposed between a flange surface of a first rotation member at a tip end section of the main shaft and a flange surface of a second rotation member to which one of the flanges of the torque member is attached; and
wherein the first rotation member and the second rotation member are connected with each other by a plurality of bolts that pass through the heat insulation plate.

7. The dynamometer device as claimed in claim 1, wherein a second heat insulation plate is provided at any flange coupling that is positioned on a side of the test-piece connection section of the torque meter.

8. The dynamometer device as claimed in claim 7, wherein the torque meter is equipped with a pair of flanges;
wherein the heat insulation plate is disposed between a flange surface of a first rotation member at a tip end section of the main shaft and a flange surface of a second rotation member to which one of the flanges of the torque member is attached; and
wherein the first rotation member and the second rotation member are connected with each other by a plurality of bolts that pass through the heat insulation plate.

9. A dynamometer device comprising:
a dynamometer in which a tip end of a main shaft projects from a housing;
a torque meter that is disposed between the main shaft and a test-piece connection section;
a heat insulation plate as a separate member that is inserted between two flange surfaces in any flange coupling positioned between the main shaft and the torque meter;
a thermally sprayed ceramic layer provided on at least one flange surface that is in contact with the heat insulation plate;
a cover that is formed to surround at least a periphery of the torque meter between an end surface of the housing and the test-piece connection section; and
an air conditioner that supplies a temperature-controlled wind to an inside space of the cover;
wherein a second heat insulation plate is provided at any flange coupling that is positioned on a side of the test-piece connection section of the torque meter;
wherein the torque meter is equipped with a pair of flanges;
wherein the heat insulation plate is disposed between a flange surface of a first rotation member at a tip end section of the main shaft and a flange surface of a second rotation member to which one of the flanges of the torque member is attached;
wherein the first rotation member and the second rotation member are connected with each other by a plurality of bolts that pass through the heat insulation plate;
wherein the heat insulation plate is formed into a ring shape to have a circular opening section at a center thereof; and
wherein a circular projection section formed on an inner peripheral part of one of the first rotation member and the second rotation member and a circular recess section formed on an inner peripheral part of the other are fit to each other through the opening section.

10. The dynamometer device as claimed in claim 9, wherein the thermally sprayed ceramic layer is provided on at least one contact surface of the projection section and the recess section that are fit to each other.

11. The dynamometer device as claimed in claim 7, wherein the cover extends from the end surface of the housing to a front end surface of the test-piece connection section; and
wherein the cover is formed at a front wall along a front end surface of the test-piece connection section with a circular opening section through which the test-piece connection section is exposed.

12. The dynamometer device as claimed in claim 11, wherein the torque meter is equipped with a pair of flanges;
wherein the heat insulation plate is disposed between a flange surface of a first rotation member at a tip end section of the main shaft and a flange surface of a second rotation member to which one of the flanges of the torque member is attached; and
wherein the first rotation member and the second rotation member are connected with each other by a plurality of bolts that pass through the heat insulation plate.

13. The dynamometer device as claimed in claim 1, wherein the air conditioner controls temperature of the temperature-controlled wind in accordance with a temperature detected by the torque meter.

14. The dynamometer device as claimed in claim 13, wherein the torque meter is equipped with a pair of flanges;
wherein the heat insulation plate is disposed between a flange surface of a first rotation member at a tip end section of the main shaft and a flange surface of a second rotation member to which one of the flanges of the torque member is attached; and wherein the first rotation member and the second rotation member are connected with each other by a plurality of bolts that pass through the heat insulation plate.

15. A dynamometer device comprising:

a dynamometer in which a tip end of a main shaft projects from a housing;

a torque meter that is disposed between the main shaft and a test-piece connection section;

a heat insulation plate as a separate member that is inserted between two flange surfaces in any flange coupling positioned between the main shaft and the torque meter;

a thermally sprayed ceramic layer provided on at least one flange surface that is in contact with the heat insulation plate;

a cover that is formed to surround at least a periphery of the torque meter between an end surface of the housing and the test-piece connection section; and an air conditioner that supplies a temperature-controlled wind to an inside space of the cover;

wherein the air conditioner controls temperature of the temperature-controlled wind in accordance with a temperature detected by the torque meter;

wherein the torque meter is equipped with a pair of flanges;

wherein the heat insulation plate is disposed between a flange surface of a first rotation member at a tip end section of the main shaft and a flange surface of a second rotation member to which one of the flanges of the torque member is attached;

wherein the first rotation member and the second rotation member are connected with each other by a plurality of bolts that pass through the heat insulation plate;

wherein the heat insulation plate is formed into a ring shape to have a circular opening section at a center thereof; and wherein a circular projection section formed on an inner peripheral part of one of the first rotation member and the second rotation member and a circular recess section formed on an inner peripheral part of the other are fit to each other through the opening section.

16. The dynamometer device as claimed in claim 15, wherein the thermally sprayed ceramic layer is provided on at least one contact surface of the projection section and the recess section that are fit to each other.

17. The dynamometer device as claimed in claim 13, wherein the cover extends from the end surface of the housing to a front end surface of the test-piece connection section; and wherein the cover is formed at a front wall along a front end surface of the test-piece connection section with a circular opening section through which the test-piece connection section is exposed.

18. The dynamometer device as claimed in claim 17, wherein a second heat insulation plate is provided at any flange coupling that is positioned on a side of the test-piece connection section of the torque meter.

19. The dynamometer device as claimed in claim 18, wherein the torque meter is equipped with a pair of flanges;

wherein the heat insulation plate is disposed between a flange surface of a first rotation member at a tip end section of the main shaft and a flange surface of a second rotation member to which one of the flanges of the torque member is attached; and wherein the first rotation member and the second rotation member are connected with each other by a plurality of bolts that pass through the heat insulation plate.

* * * * *